(12) United States Patent
Fujimoto

(10) Patent No.: US 8,189,299 B2
(45) Date of Patent: May 29, 2012

(54) MAGNETIC HEAD SUSPENSION

(75) Inventor: Yasuo Fujimoto, Kyoto (JP)

(73) Assignee: Suncall Corporation, Kyoto-fu (JP)

( * ) Notice: Subject to any disclaimer, the term of this patent is extended or adjusted under 35 U.S.C. 154(b) by 1300 days.

(21) Appl. No.: 11/850,827

(22) Filed: Sep. 6, 2007

(65) Prior Publication Data

US 2008/0062569 A1 Mar. 13, 2008

(30) Foreign Application Priority Data

Sep. 7, 2006 (JP) ................................ 2006-243088

(51) Int. Cl.
*G11B 5/55* (2006.01)
(52) U.S. Cl. ..................................... 360/266; 360/244.5
(58) Field of Classification Search .............. 360/244.5, 360/244.3, 266, 266.1, 265.9, 245.2, 265.7
See application file for complete search history.

(56) References Cited

U.S. PATENT DOCUMENTS

| | | | | |
|---|---|---|---|---|
| 4,912,583 A * | 3/1990 | Hinlein | ....................... | 360/244.5 |
| 5,283,704 A * | 2/1994 | Reidenbach | ............... | 360/264.3 |
| 6,469,869 B1 * | 10/2002 | Vera | ............................ | 360/244.5 |
| 6,473,272 B1 * | 10/2002 | Resh et al. | ..................... | 360/266 |
| 6,967,800 B1 * | 11/2005 | Chen et al. | ................. | 360/97.01 |
| 7,440,234 B1 * | 10/2008 | Cheng et al. | ................ | 360/266 |
| 7,573,680 B1 * | 8/2009 | Kulangara | ................. | 360/244.8 |
| 2002/0181155 A1 * | 12/2002 | Takagi et al. | .............. | 360/244.3 |
| 2005/0030670 A1 * | 2/2005 | Ando et al. | ................ | 360/244.8 |
| 2006/0209456 A1 * | 9/2006 | Bisuwasu et al. | .......... | 360/97.02 |
| 2007/0115590 A1 * | 5/2007 | Resh et al. | ................. | 360/244.3 |

FOREIGN PATENT DOCUMENTS

| | | |
|---|---|---|
| JP | 57-198780 | 12/1982 |
| JP | 59-180855 | 10/1984 |
| JP | 60-136978 | 7/1985 |
| JP | 09-073739 | 3/1997 |
| JP | 09-139039 | 5/1997 |
| JP | 09-198825 | 7/1997 |
| JP | 10-092123 | 4/1998 |
| JP | 2001-195845 | 7/2001 |
| JP | 2004-272974 | 9/2004 |
| JP | 2004-342224 | 12/2004 |
| JP | 2006-286094 | 10/2006 |

OTHER PUBLICATIONS

The Notification of Reasons for Rejection for corresponding Japanese Appl. No. 2006-243088, (with English translation) Japanese Patent Office, mailed Jul. 18, 2008, 4 pgs.
The Notification of Reasons for Rejection for related Japanese patent Appl. No. 2008-227427, Japanese Patent Office, mailed Dec. 24, 2010, 6 pgs.
Notification of Reason(s) for Rejection for Japanese Patent Appl. No. 2011-017678, Japanese Patent Office, mailed Dec. 2, 2011, 4 pages.

* cited by examiner

*Primary Examiner* — Brian Miller
(74) *Attorney, Agent, or Firm* — Sterne, Kessler, Goldstein & Fox PLLC

(57) ABSTRACT

The present invention provides a magnetic head suspension including a flexure part including a magnetic head mounting region for supporting a magnetic head slider; a load bending part for generating a load to press the magnetic head slider towards a recording medium; a load beam part for transmitting the load generated by the load bending part to the magnetic head mounting region; and a base part connected to a proximal end side of the load bending part. The base part has a thin thickness region extending from a distal end towards a proximal end side by a predetermined distance and having a thin thickness compared to an other region.

9 Claims, 15 Drawing Sheets

MAGNETIC HEAD SUSPENSION

BACKGROUND OF THE INVENTION

1. Field of the Invention

The present invention relates to a suspension for supporting a magnetic head slider for reading and/or writing data with respect to a recording medium such as a hard disc device, and a method of manufacturing a base part that is one component of the suspension.

2. Background Art

Enhancement in resonance characteristic and enhancement in impact resistance are desired in the magnetic head suspension.

That is, the resonance frequency of the magnetic head suspension must be increased in order to rapidly move the mounted magnetic head slider in the seek direction to a target track on the recording medium such as a hard disc drive.

The impact resistance must be enhanced to prevent the magnetic head slider from jumping in a Z direction (direction orthogonal to the recording surface of the recording medium) and damaging the recording surface of the recording medium when impact is applied while the magnetic head slider is positioned at a load position (i.e., while the magnetic head slider is in a floating state over the recording medium).

However, enhancement in resonance characteristic and enhancement in impact resistance counteract each other.

If the thickness of a member configuring the magnetic head suspension is increased, for example, the rigidity of the magnetic head suspension increases and the resonance characteristic is enhanced, but the impact resistance degrades due to increase in weight.

Regarding this point, it has been proposed to enhance the resonance characteristic by attaching a damping member made of a viscoelastic material having a large damping characteristics at a load beam part in the magnetic head suspension, instead of enhancing the resonance characteristic by increasing rigidity (see Japanese Laid-Open Patent Publication No. 59-180855).

The configuration disclosed in the prior art document is effective in reducing the amplitude of the resonance mode of the magnetic head suspension by the damping member while preventing increase in weight of the magnetic head suspension as much as possible, but has drawbacks in that cost increases due to increase in the number of components, and the vibration characteristic varies depending on attachment precision of the damping member.

BRIEF SUMMARY OF THE INVENTION

In view of the above problems in the prior art, the present invention aims to provide a magnetic head suspension having a simple configuration capable of simultaneously enhancing resonance characteristics and impact resistance.

The present inventors studied which property out of the various properties of the magnetic head suspension is important for resonance characteristics and impact resistance using a model 1 with one-degree-of-freedom shown in FIG. 1.

The model 1 has a spring 2 having a first end supported at a rotation center 5, and a rigid body 3 connected to a second end of the spring 2.

The natural angular frequency ωn and the damping ratio of the model 1 are respectively expressed as:

$$\omega n = \sqrt{(K/I)}: \quad \text{equation (1)}$$

$$\text{damping ratio} = C/2\sqrt{(I \times K)}: \quad \text{equation (2)}$$

where "I" is an inertia moment of the rigid body 3 at the center of gravity G of the rigid body 3, where is away from the rotation center 5 by a distance "r", "C" is a damping constant, and "K" is the rigidity in the rotating direction of the spring 2 in the model 1.

The damping ratio can be increased by decreasing the rigidity "K" (see equation (2)), but then the natural angular frequency "ωn" becomes small (see equation (1)), resulting in lowering the resonance frequency.

The damping ratio can also be increased by decreasing the inertia moment "I" (see equation (2)), but the rigidity lowers and the resonance frequency lowers if the mass is simply reduced with respect to the entire magnetic head suspension (see equation (1)).

The present inventors thus focused on a base part that has the largest mass (generally, 65% to 95% of the entire mass of the magnetic head suspension) out of the components of the magnetic head suspension, and invented a novel magnetic head suspension capable of preventing lowering in the rigidity "K" involved in reduction of mass as much as possible while having (I×K) in equation (2) small to make the damping ratio large by reducing the mass of the distal end side of the base part.

That is, one aspect of the present invention provides, in order to achieve the object, a magnetic head suspension including a flexure part that has a magnetic head mounting region for supporting a magnetic head slider; a load bending part for generating a load to press the magnetic head slider towards a recording medium; a load beam part for transmitting the load generated by the load bending part to the magnetic head mounting region; and a base part connected to a proximal end side of the load bending part. The base part has a thin thickness region extending from a distal end towards a proximal end side by a predetermined distance and having a thin thickness compared to an other region.

According to the one aspect of the present invention, it is possible to achieve an effect of reducing an inertia moment as much as possible thanks to reduction of the mass.

Therefore, it is possible to effectively achieve enhancement in resonance characteristics as well as enhancement in impact resistance.

Preferably, a boundary line between the thin thickness region and the other region is a horseshoe shape in plan view so that its center in the width direction is positioned closer to a proximal end side of the base part.

According to the configuration, it is possible to increase a rigidity in the seek direction of the base part by thick thickness regions positioned on both sides in the width direction of the thin thickness region at a proximal edge side of the thin thickness region, thereby further enhancing the resonance characteristic in the seek direction.

Alternatively, the boundary line may be a circular arc shape in plan view so that its center in the width direction is positioned closer to a proximal end side of the base part.

According to the configuration, it is possible to manufacture the base part capable of further enhancing the resonance characteristic in the seek direction more easily.

In the above various configurations, the thin thickness region is preferably provided with flange bending portions on both sides in the width direction of the thin thickness region in at least one area long the longitudinal direction of the thin thickness region.

According to the configuration, it is possible to enhance the rigidity in the horizontal direction, the vertical direction and the torsional direction without involving increase in mass, thereby further enhancing the resonance characteristics and the impact resistance.

Another aspect of the present invention provides, in order to achieve the object, a magnetic head suspension including a flexure part that has a magnetic head mounting region for supporting a magnetic head slider; a load bending part for generating a load to press the magnetic head slider towards a recording medium; a load beam part for transmitting the load generated by the load bending part to the magnetic head mounting region; and a base part connected to a proximal end side of the load bending part. The base part has a thin thickness region extending from a distal end towards a proximal end side by a predetermined distance only at a center in the width direction of the base part and having a thickness thinner than that of an other region that includes both end sides in the width direction of the thin thickness region.

According to the aspect of the present invention, it is possible to achieve an effect of reducing an inertia moment as much as possible thanks to reduction of the mass without worsening the rigidity. Therefore, it is possible to enhance impact resistance while effectively enhancing resonance characteristics.

In the above various configurations, a member configuring the base part may include a thick thickness member configuring the other region and a thin thickness member configuring the thin thickness region, the thin thickness member being different body from the thick thickness member. The thick thickness member and the thin thickness member are fixed to each other by welding or the like.

According to the configuration, it is possible to set the thickness of the thin thickness region and the thick thickness region independently to each other, thereby easily manufacturing the base part with the thin thickness region.

Alternatively, the base part may be formed by a single metal member.

Furthermore, the base part may be formed by a laminated member including a metal material and a resin material that has a damping constant larger than that of the metal material.

According to the configuration, it is possible to reduce an amplitude of the base part.

A member configuring the load bending member may include a fixing region that is fixed to the base part and a load generating region that is positioned between the fixing region and the load beam part.

Preferably, the fixing region is fixed to the base part within a concave part that is formed by the thin thickness region and the other region so as to be opened to a distal end side of the base part.

According to the configuration, it is possible to reduce a thickness in a Z direction (a vertical direction orthogonal to a recording surface of a recording medium) of the suspension as much as possible.

Alternatively, the fixing region may be fixed to the base part at a surface opposite to the concave part.

In the above various configurations, the load bending part and the load beam part may be formed integrally by a single member.

The present invention further provides a method of manufacturing a base part of a magnetic head suspension, the base part including a thin thickness region that has a thickness thinner than that of the other region and openings that includes an attachment hole and a positioning hole.

The method includes the steps of: preparing a plate-shaped member made of a single material having a substantially uniform thickness; arranging a resist only on one surface of the plate-shaped member at a region corresponding to the thin thickness region and arranging the resist on both surfaces at a region corresponding to the other region so that both surfaces at regions corresponding to the openings are exposed; and performing etching process from both surface sides of the plate-shaped member with the resist as the etching mask.

According to the method, it is possible to simultaneously form the thin thickness region and the openings including the attachment hole and the positioning hole.

The present invention further provides a method of manufacturing a base part of a magnetic head suspension, the base part including a thin thickness region that has a thickness thinner than that of the other region and openings that includes an attachment hole and a positioning hole; the method including the steps of: preparing a plate-shaped member made having a laminated structure with a substantially uniform thickness, the laminated structure including first and second metal materials, and a resin material sandwiched by the first and second metal materials; arranging a resist only on one side on which the second metal material is positioned at a region corresponding to the thin thickness region and arranging the resist on both sides at a region corresponding to the other region so that both of the first and second metal materials are exposed at regions corresponding to the openings; performing a first etching process against the exposed first and second metal materials from both sides of the plate-shaped member with the resist as the etching mask; and performing a second etching process against the resin material with the resist or the remaining first and second metal materials.

According to the method, it is possible to simultaneously form the thin thickness region and the openings including the attachment hole and the positioning hole.

For example, the second etching process may be performed from only one side of the plate-shaped member on which the second metal material is positioned.

According to the method, it is possible to leave the resin material at the thin thickness region.

Alternatively, the second etching process may be performed from both sides of the plate-shaped member.

According to the method, it is possible to leave only the second metal material at the thin thickness region.

BRIEF DESCRIPTION OF THE DRAWINGS/FIGURES

The above, and other objects, features and advantages of the present invention will become apparent from the detailed description thereof in conjunction with the accompanying drawings wherein.

FIGS. 3(a) to 3(c) are respectively a plan view (seen from a side opposite to the recording medium), a side view and a rear view (seen from the recording medium side) of the magnetic head suspension according to the first embodiment.

Figure 4:
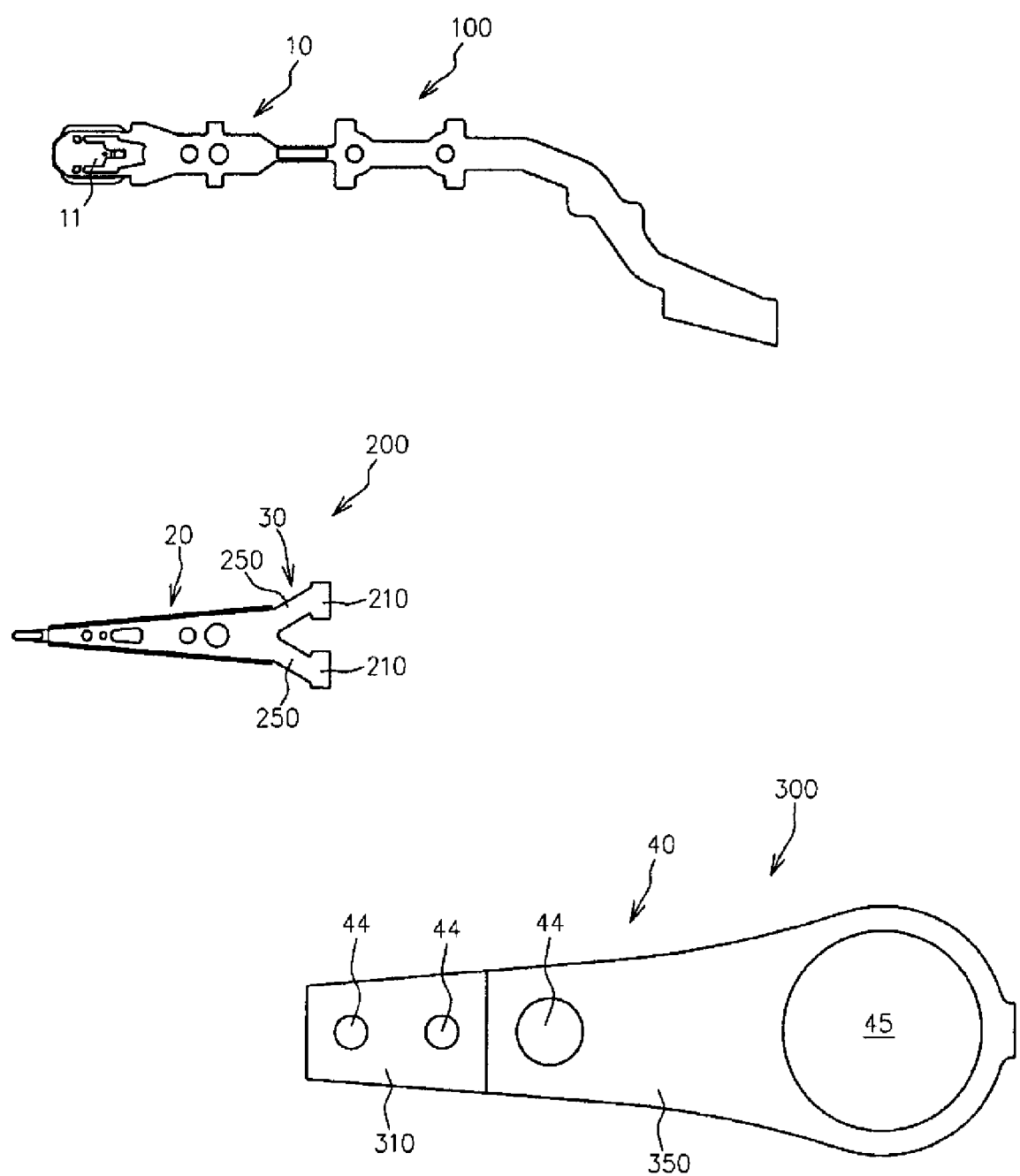

FIG. 4 is an exploded view of the magnetic head suspension according to the first embodiment.

Figure 5:
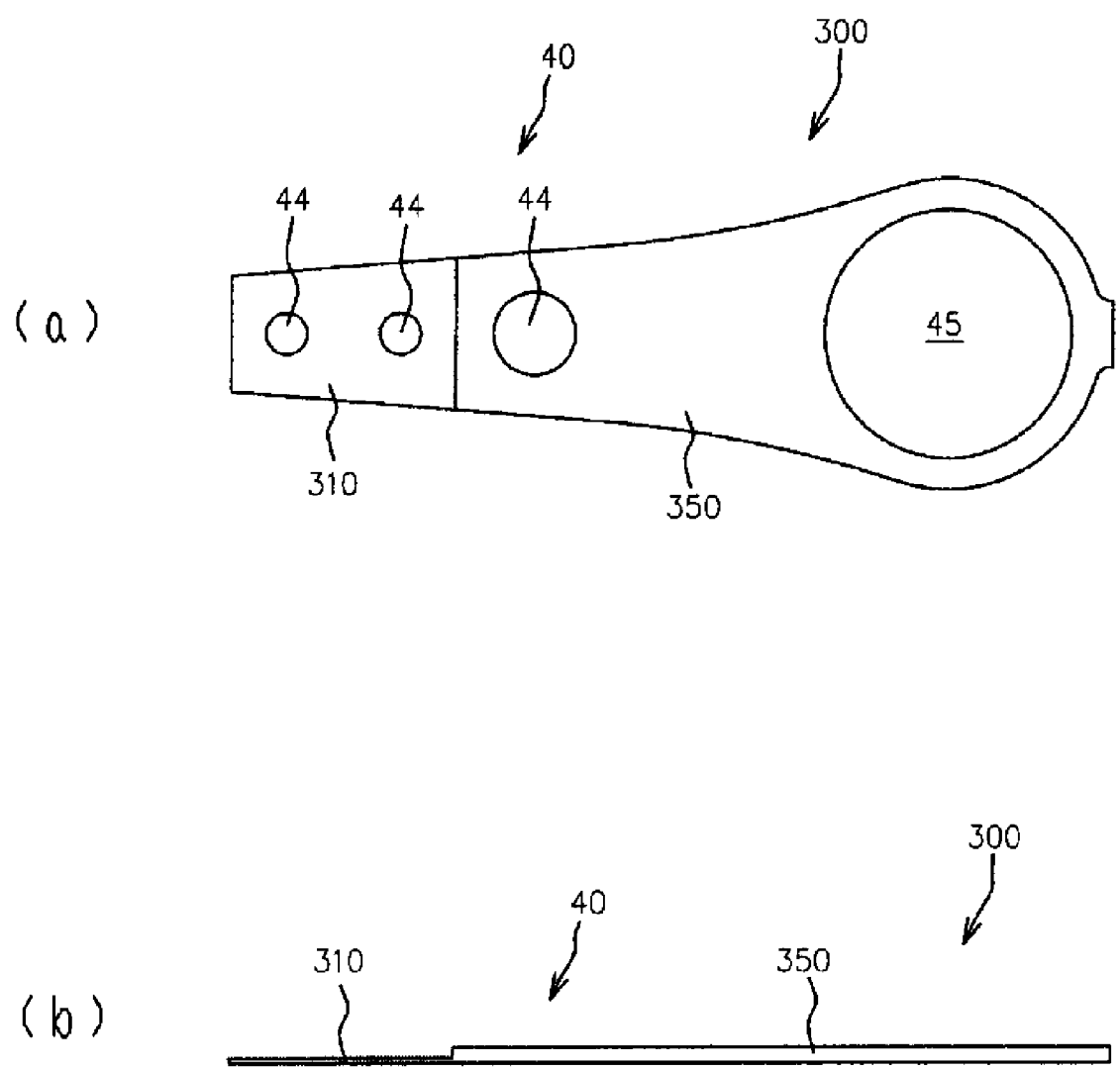

FIGS. 5(a) and 5(b) are respectively a plan view (seen from the side opposite to the recording medium) and a side view of a base part of the magnetic head suspension according to the first embodiment.

FIGS. 6(a) to 6(d) are schematic views showing one example of a method of manufacturing the base part of the magnetic head suspension according to the first embodiment.

FIGS. 7(a) to 7(d) are schematic views showing another example of a method of manufacturing the base part.

FIGS. 8(a) to 8(c) are respectively a plan view (seen from the side opposite to the recording medium), a side view, and a rear view (seen from the recording medium side) of a magnetic head suspension according to a second embodiment of the present invention.

FIGS. 9(a) and 9(b) are respectively a plan view and a side view of a base part of a magnetic head suspension according to a third embodiment of the present invention.

FIGS. 10(a) to 10(e) are schematic views showing one example of a method of manufacturing the base part of the magnetic head suspension according to the third embodiment.

Figure 11:
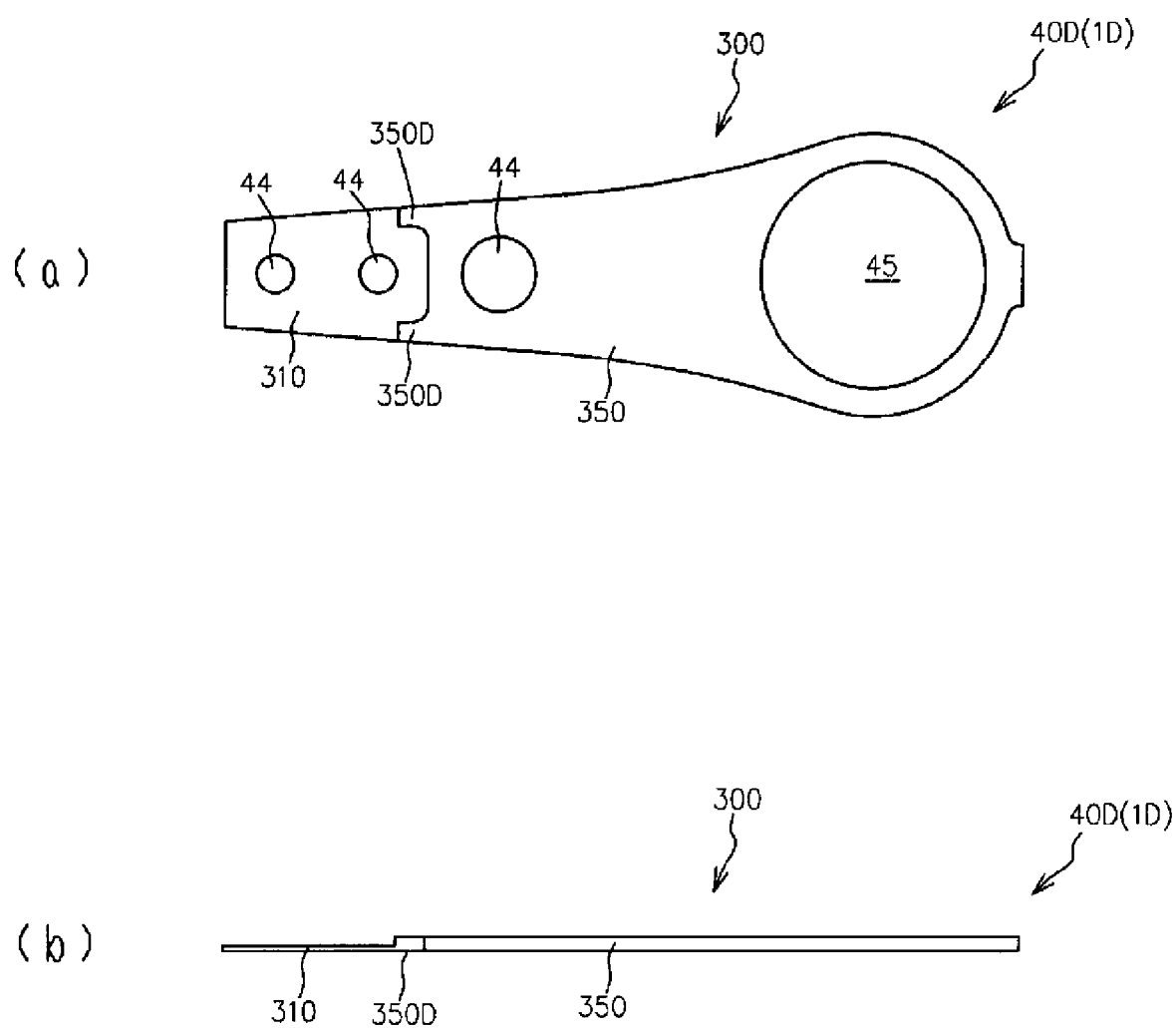

FIGS. 11(a) and 11(b) are respectively a plan view and a side view of a base part of a magnetic head suspension according to a fourth embodiment of the present invention.

Figure 12:
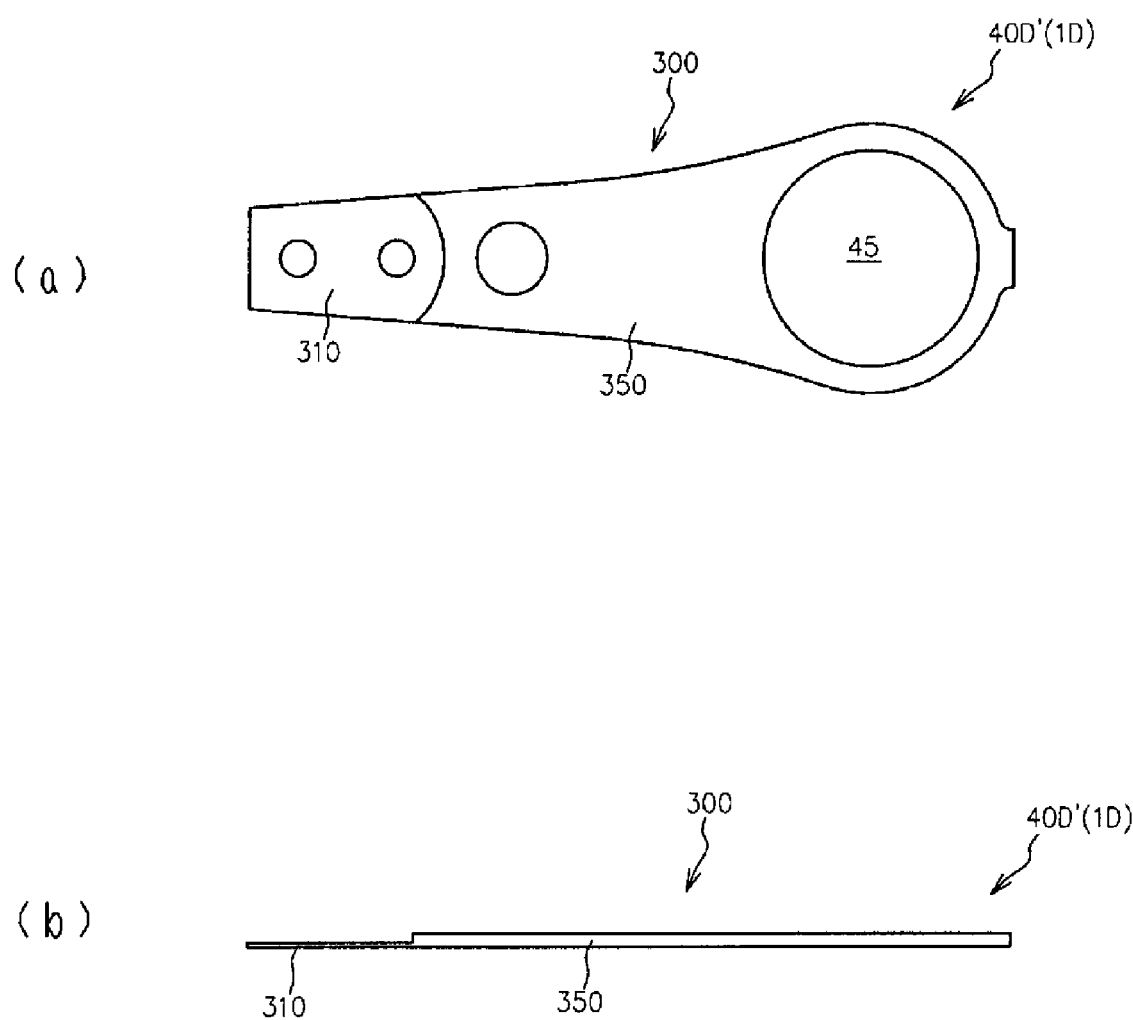

FIGS. 12(a) and 12(b) are respectively a plan view and a side view of a base part modified from the base part shown in FIGS. 11(a) and 11(b).

Figure 13:
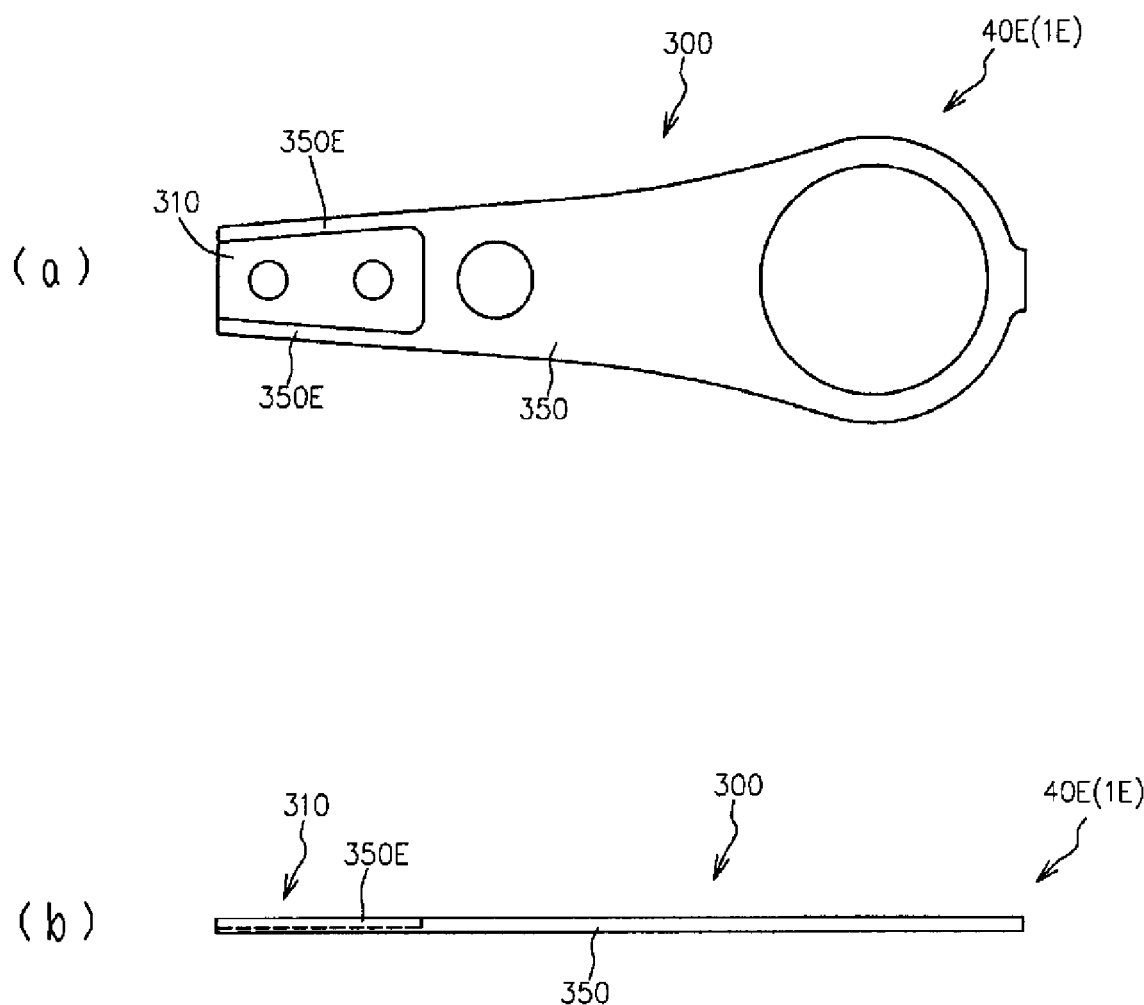

FIGS. 13(a) and 13(b) are respectively a plan view and a side view of a base part of a magnetic head suspension according to a fifth embodiment of the present invention.

Figure 14:
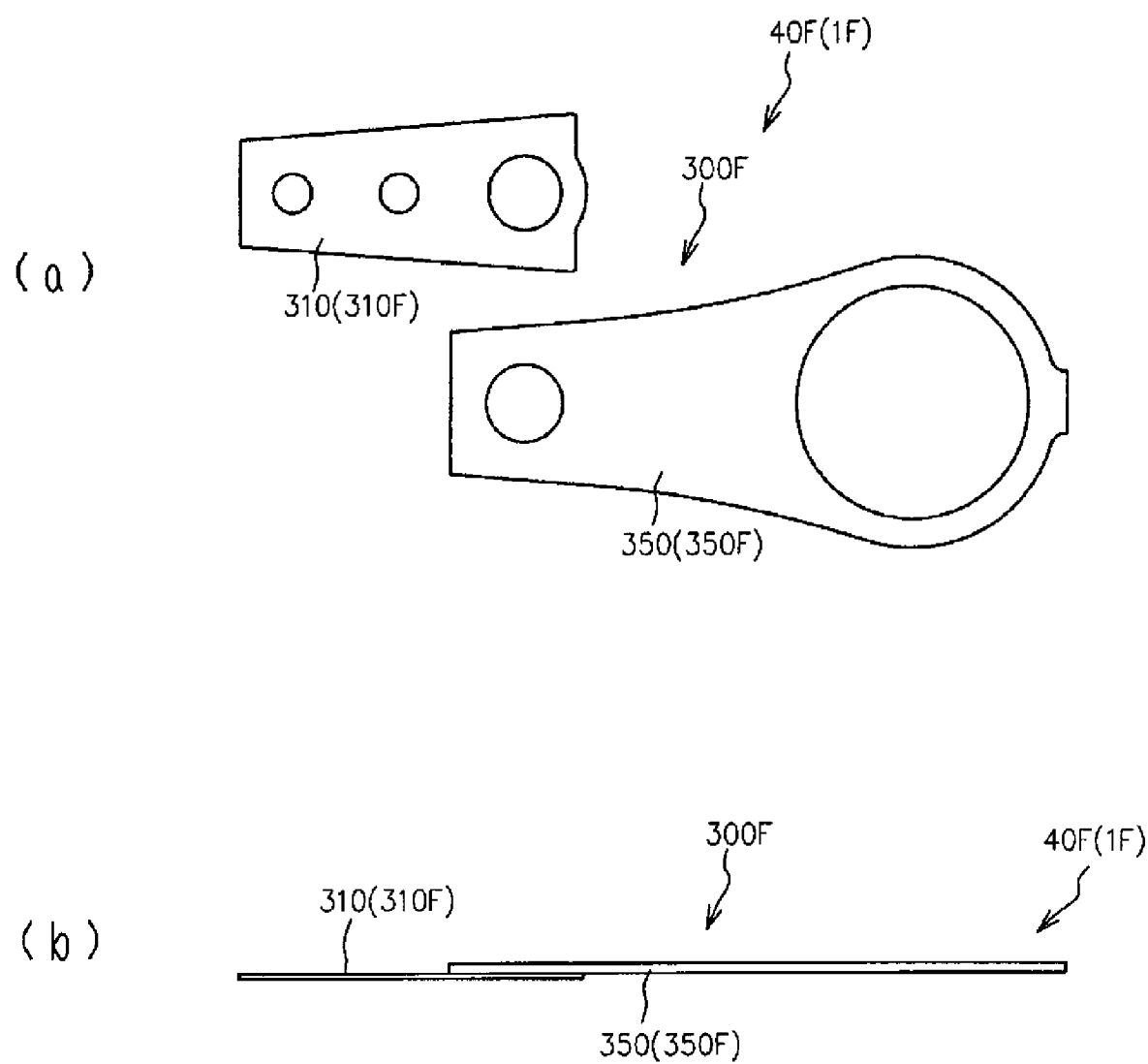

FIGS. 14(a) and 14(b) are respectively an exploded plan view and a side view of a base part of a magnetic head suspension according to a sixth embodiment of the present invention.

FIGS. 15(a) and 15(b) are respectively an exploded plan view and a side view of a base part modified from the base part shown in FIGS. 14(a) and 14(b).

DETAILED DESCRIPTION OF THE INVENTION

First Embodiment

A preferred embodiment of a magnetic head suspension according to the present invention will now be described with reference to the accompanying drawings.

Figure 1:
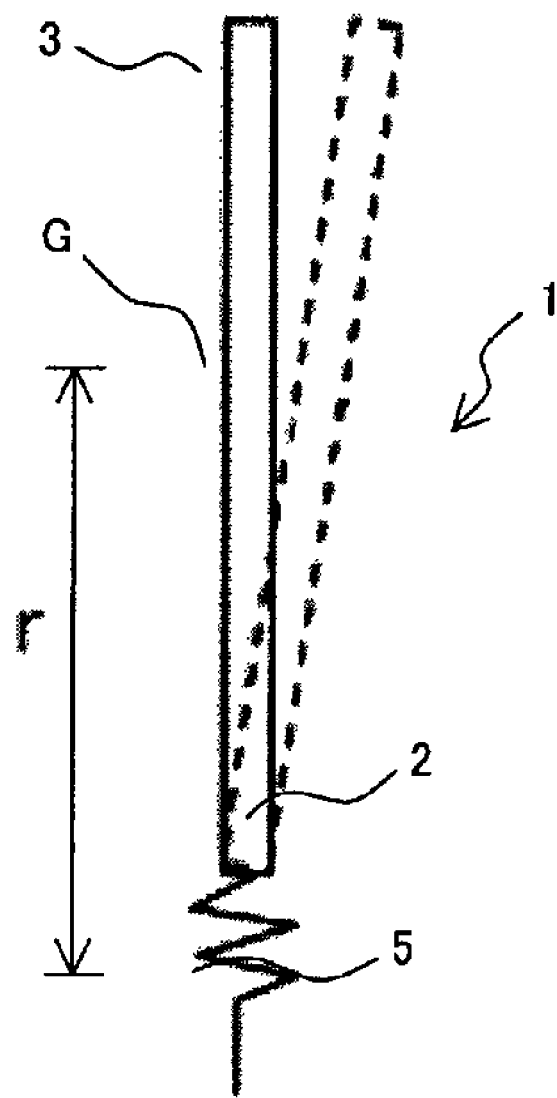
FIG. 1 is a schematic view of a model shall be deemed as a magnetic head suspension.
Figure 2:
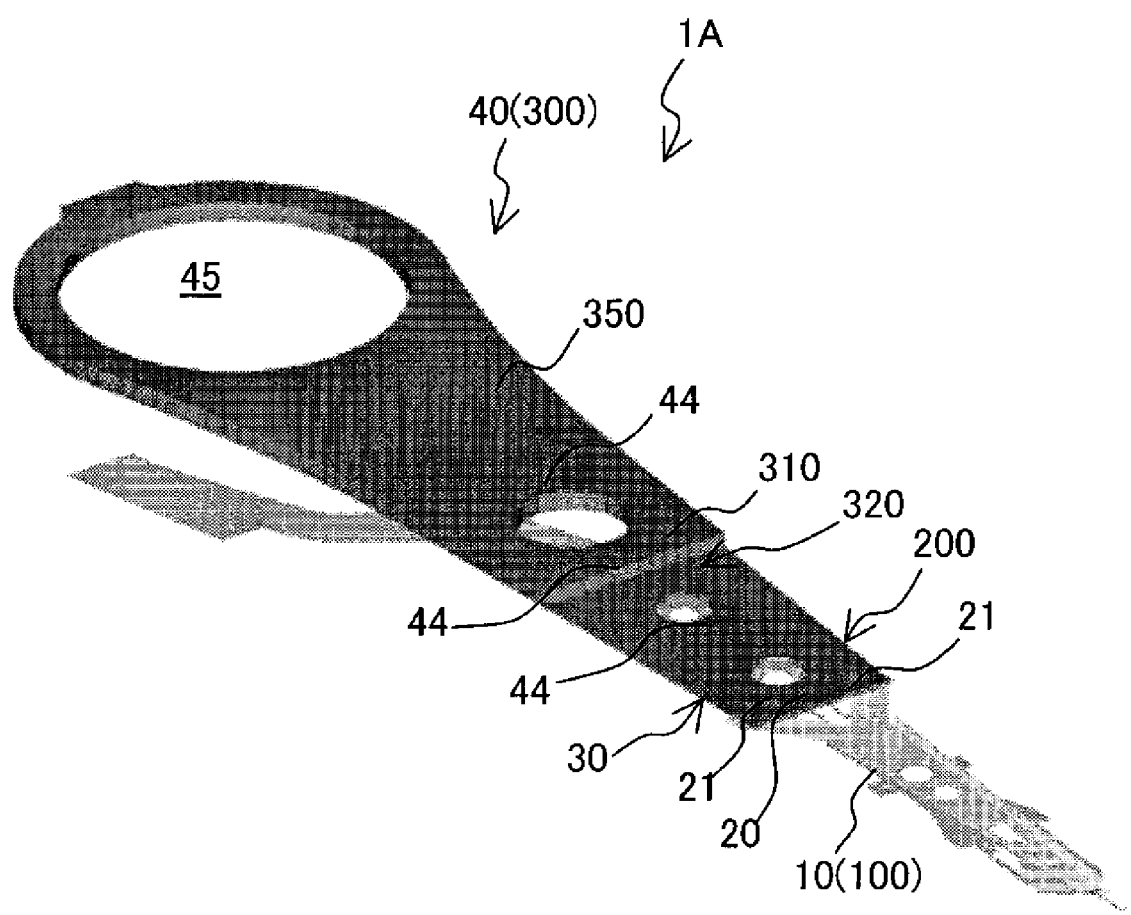
FIG. 2 is a perspective view of a magnetic head suspension according to a first embodiment of the present invention when seen from a side opposite to a recording medium.

FIG. 2 is a perspective view of a magnetic head suspension 1A according to the present embodiment seen from the side opposite to a recording medium.

FIGS. 3(a) to 3(c) respectively show a plan view (seen from the side opposite to the recording medium), a side view, and a rear view (seen from the recording medium side) of the magnetic head suspension 1A.

Figure 3:
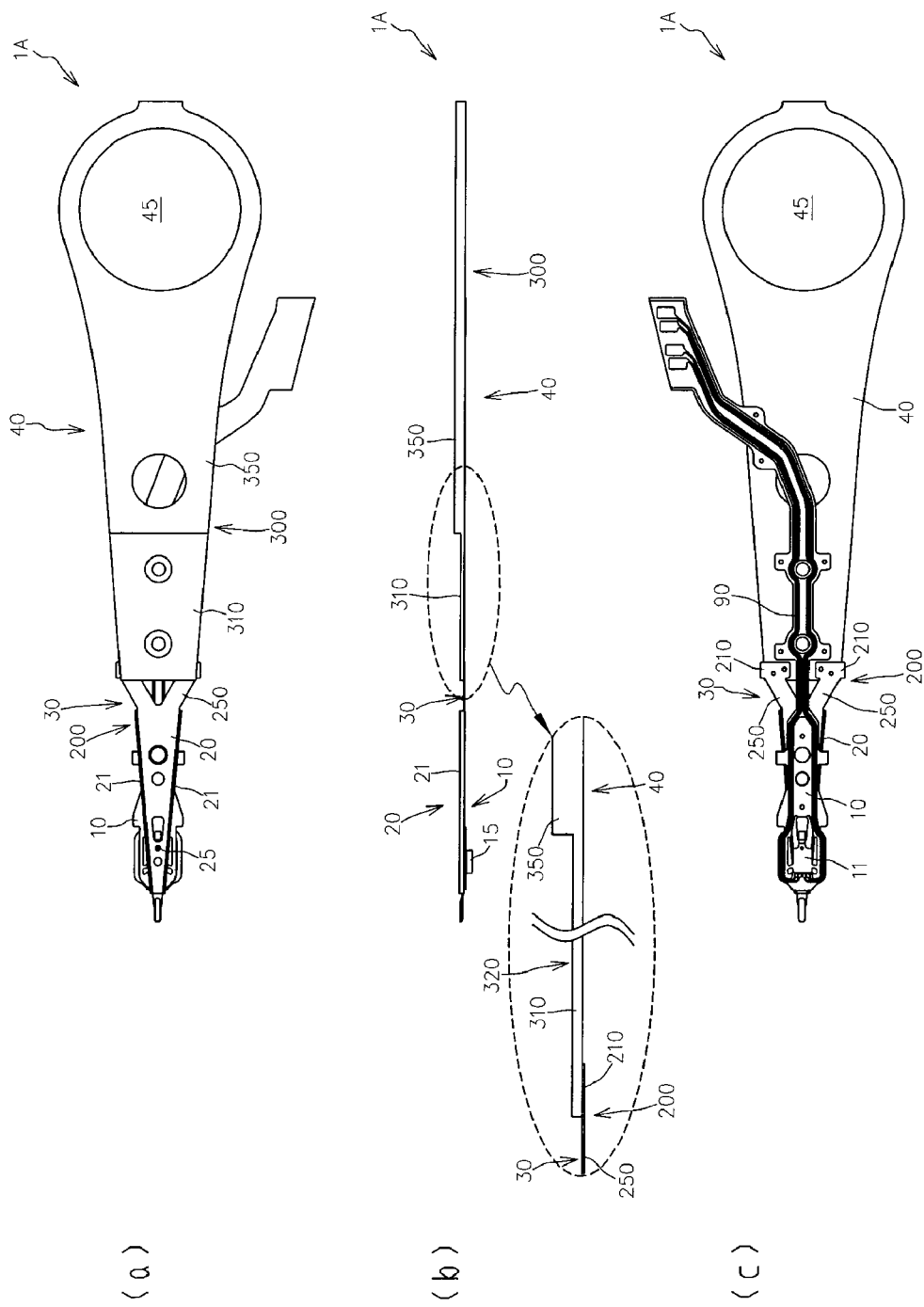

As shown in FIGS. 2 and 3, the magnetic head suspension 1A according to the present embodiment includes a flexure part 10 with a magnetic head mounting region 11 for supporting a magnetic head slider 15, a load bending part 30 for generating a load to press the magnetic head slider 15 towards the recording medium, a load beam part 20 for transmitting the load generated by the load bending part 30 to the magnetic head mounting region 11, and a base part 40 connected to a proximal end side of the load bending part 30.

The flexure part 10 is made of a stainless steel plate member having a thickness of 10 μm to 25 μm, for example.

The flexure part 10 has a proximal end side joined to the load beam part 20 so that the magnetic head mounting region 11 is cantilevered by the load beam part 20.

In the present embodiment, the flexure part 10 is configured by a member different from a member configuring the load beam part 20, and the flexure part 10 is joined to the load beam part 20 by welding.

The flexure part 10 is provided with a wiring structure 90 for transmitting electrical signals between the magnetic head slider 15 and the outside.

The wiring structure 90 may have a configuration in which an insulation film and a conductor film are integrally formed on the flexure part 10.

The load beam part 20 has rigidity enough to transmit the magnetic head pressing load generated by the load bending part 30 to the magnetic head mounting region 11 and to move the magnetic head slider 15 in a seek direction at a target track to be positioned.

The load beam part 20 is provided with a dimple 25 at a position corresponding to the magnetic head mounting region 11 of the flexure part 10.

It is possible to enhance (lower) pitch rigidity and roll rigidity of the magnetic head mounting region 11 by providing the dimple 25. Therefore, follow-up property with respect to the recording surface of the magnetic head slider 15 that is mounted on the magnetic head mounting region 11 can be enhanced.

The load beam part 20 preferably has a flange portion 21 on both sides in the width direction of the suspension 1A.

It is possible to increase the rigidity of the load beam part 20 without increasing the mass by arranging such flange portions 21.

The load beam part 20 more preferably has a substantially isosceles triangle shape in plan view, where the proximal end side connected to the load bending part 30 is has a wide width and the width becomes narrower as extending from the proximal end side towards the distal end side.

It is possible to increase the rigidity while preventing degradation of impact property by forming the load beam part into a substantially isosceles triangle in plan view as described above.

The load bending part 30 serves as a plate spring that generates the magnetic head pressing load to press the magnetic head slider 15 towards the recording surface against the pressure of an air film generated between the magnetic head slider 15 and the recording surface with the rotation of the recording medium such as a magnetic disc, and to ensure a constant floating amount of the magnetic head slider 15.

In the present embodiment, the load bending part 30 is integrally formed with the load beam part 20.

FIG. 4 shows an exploded view of the magnetic head suspension 1A.

The magnetic head suspension 1A according to the present embodiment includes a first member 100 configuring the flexure part 10, a second member 200 configuring the load bending part 30 and the load beam part 20, and a third member 300 configuring the base part 40, where the first to third members 100, 200, 300 are fixed through welding and the like.

The second member 200 has a proximal end side forming the load bending part 30 and a distal end side forming the load beam part 20.

Specifically, the flange portion 21 is not arranged at a region forming the load bending part 30 of the second member 200, and the flange portion 21 is arranged only at a region forming the load beam part 20.

The region forming the load bending part 30 of the second member 200 preferably has a substantially triangular shape in plan view, where the proximal end side has a wide width and the distal end side has a narrow width.

In the present embodiment, the region forming the load bending part of the second member 200 is formed into a substantially triangular shape in plan view, and has an opening formed at substantially the middle in the width direction, as shown in FIG. 4.

The second member 200 is made of stainless material having a plate thickness of 25 μm to 50 μm, for example.

Obviously, the member configuring the load beam part 20 and the member configuring the load bending part 30 may be different bodies.

The member configuring the load bending part 30 (the second member 200 in the present embodiment) includes a fixing region 210 that is fixed to the base part 40 and a load generating region 250 that is positioned between the fixing region 210 and the load beam part 20, as shown in FIG. 4.

The base part 40 is configured to support an assembly including the load bending part 30, the load beam part 20 and the flexure part 10, and to transmit driving power from an actuator to the assembly.

As shown in FIGS. 2 to 4, the base part 40 is an arm that is attached to a bearing of a voice coil motor in the present embodiment.

Alternatively, the base part 40 may be a mount that is attached to an E block by caulking.

FIGS. 5(a) and 5(b) respectively show a plan view (seen from the side opposite to the recording medium) and a side view of the base part 40.

As shown in FIGS. 5(a) and 5(b), the third member 300 configuring the base part 40 is configured so that a region extending from a distal end towards a proximal end side by a predetermined distance is a thin thickness region 310 having a plate thickness thinner than that of an other region 350.

The thickness of the other region 350 may be 0.1 mm to 0.5 mm, whereas the thickness of the thin thickness region 310 may be less than or equal to 50% of the thickness of the other region 350, for example.

The magnetic head suspension 1A of such a configuration has the following advantages.

That is, the suspension 1A is configured so that a part of the base part 40, which has the largest mass among the components of the magnetic head suspension 1A, is formed into the thin thickness region 310, thereby achieving enhancement in impact resistance thanks to an effective reduction in mass.

Furthermore, since the thin thickness region 310 is formed at the distal end side of the base part 40, the inertia moment of the magnetic head suspension 1A can be effectively reduced while preventing the lowering of rigidity, which may be caused by reduction in mass, as much as possible. Therefore, it is possible to achieve enhancement in resonance characteristics including prevention of lowering of resonance frequency and reduction in amplitude in the seek direction during resonance as well as enhancement in impact resistance.

The third member 300 configuring the base part 40 may be made of metal such as iron, aluminum, titanium and stainless steel, and alloys thereof.

Alternatively, the third member 300 may be made of ceramic.

In the present embodiment, the base part 40 is formed from a single metal material.

FIGS. 6(a) to 6(d) show one example of a method of manufacturing the base part 40 in the present embodiment.

Figure 6:
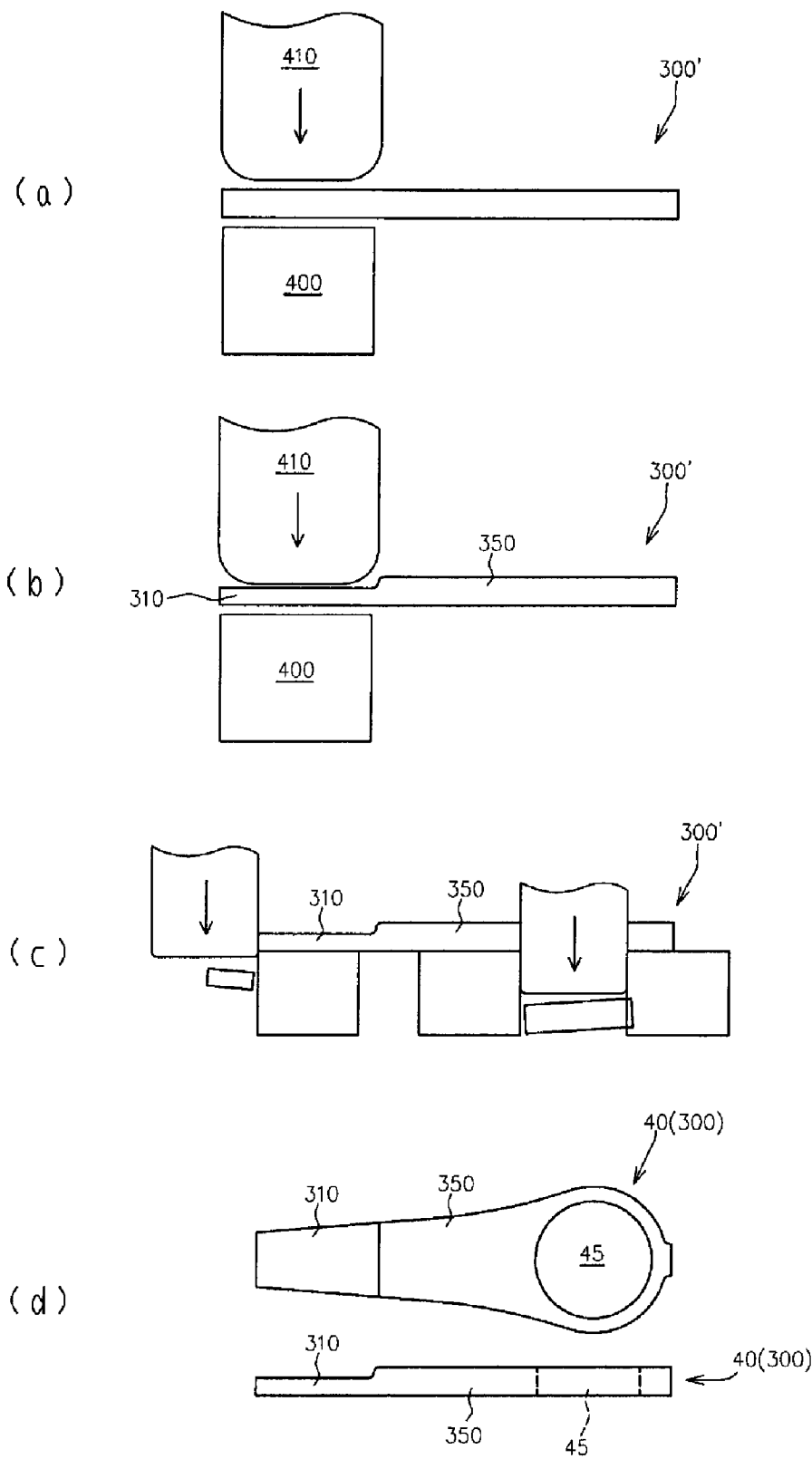

In the manufacturing method shown in FIG. 6, a metal plate 300' having a substantially uniform predetermined thickness (e.g., 0.1 mm to 0.5 mm) is placed on a die 400, and pressing process (compression process) is performed on the portion to be the thin thickness region 310 by pressing with a punch 410, so that the thickness of the thin thickness region 310 becomes a predetermined thickness thinner than that of the other region 350 (see FIGS. 6(a) and 6(b)).

The material extruded to the outside as a result of the pressing process is then cut out by punching process (see FIG. 6(c)) to match with the shape of a product. The punching process includes a hole punching process in addition to the outer shape punching process for matching the outer shape of the metal material with the final product shape. The hole formed by the hole punching process includes positioning holes 44 (see FIG. 5(a)) used in the assembling work of the magnetic head suspension 1A and an attachment hole 45 (see FIGS. 5(a) and 6(d)) for attaching the base part 40 to the actuator.

Lastly, surface treatment processing such as chemical polishing and electrolytic grinding is performed to obtain the base part 40 (see FIG. 6(d)).

According to such a manufacturing method, the base part 40 of the same shape can be efficiently produced in large quantities.

In place of the press processing shown in FIGS. 6(a)-6(d), the base part 40 can be manufactured by etching process.

FIGS. 7(a) to 7(d) show an example of a method of manufacturing the base part 40 using the etching process.

Figure 7:
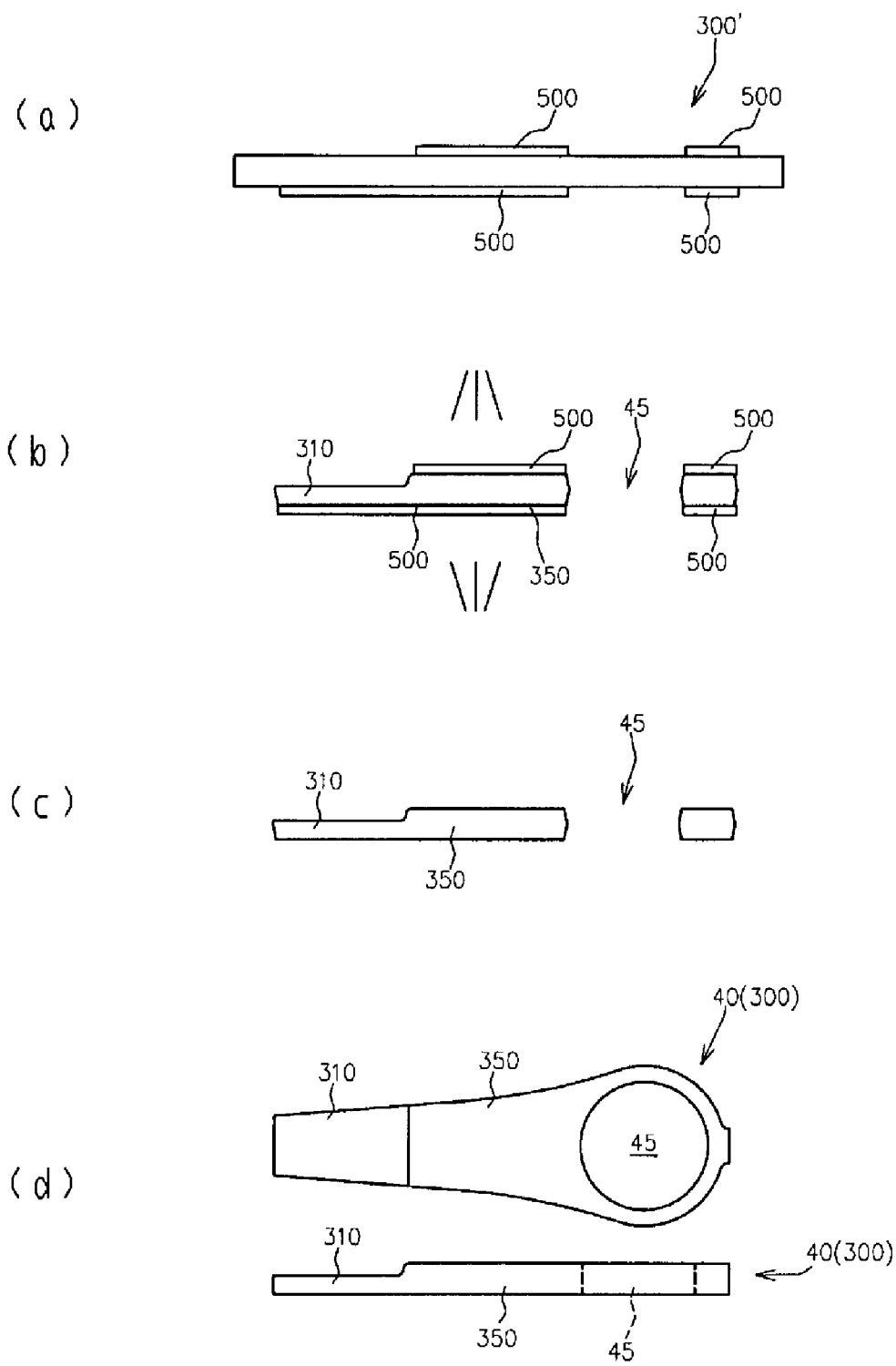

In the manufacturing method shown in FIGS. 7(a)-7(d), the metal plate 300' having a substantially uniform predetermined thickness (e.g., 0.1 mm to 0.5 mm) is first masked with a resist 500 that has a shape corresponding to the final product shape (including the outer shape and the hole shapes) (see FIG. 7(a)).

The metal plate 300' is then subjected to etching process with the resist 500 as the etching mask, thereby reducing the plate thickness of the thin thickness region 310 and forming the necessary openings (the positioning holes 44 and the attachment hole 45) (see FIG. 7(b)). Only the attachment hole 45 is shown in FIGS. 7(b) to 7(d).

The etching process is performed from both surfaces of the metal plate 300' in a state where the resist 500 are arranged on both surfaces at the other region 350 that is not subjected to the etching process, the resist 500 is arranged only on one surface at the thin thickness region 310, and the resist 500 is not arranged on either of the surfaces at the region where the holes are to be formed, thereby simultaneously forming the opening and the thin thickness region 310 having the thin plate thickness.

Etchant such as aqueous ferric chloride can be used when using stainless steel material for the metal plate 300'.

Subsequently, the resist 500 is removed (FIG. 7(c)), and cleaning is performed to obtain the base part 40 (FIG. 7(d)).

According to the manufacturing method using etching, the thin thickness region 310 and the openings can be simultaneously formed. Furthermore, since the surface of the thin thickness region 310 is chemically dissolved, the surface smoothness of the thin thickness region 310 can be improved.

The plate thickness of the thin thickness region 310 can be controlled with high accuracy by controlling etching conditions such as etching concentration and etching time/etching temperature.

Second Embodiment

Another embodiment of the magnetic head suspension according to the present invention will now be described with reference to the accompanying drawings.

FIGS. 8(a) to 8(c) respectively show a plan view (seen from the side opposite to the recording medium), a side view, and a rear view (seen from the recording medium side) of a magnetic head suspension 1B according to the present embodiment.

The same reference numerals denote the same members as in the first embodiment, and the description thereof will be omitted.

In the magnetic head suspension 1A according to the first embodiment, the fixing region 210 of the member configuring the load bending part 30 is fixed to a surface positioned in the same plane as the other region 350 out of both surfaces of the thin thickness region 310 (see FIG. 3(c)).

That is, in the first embodiment, the base part 40 is arranged such that a concave part 320 formed by the thin thickness region 310 and the other region 350 faces the side opposite to the recording medium, and the member 200 configuring the load bending part 30 has the fixing region 210 fixed to the surface opposite to the concave part 320 with respect to the base part 40 arranged as above (see the enlarged view of FIG. 3(b)).

In the magnetic head suspension 1B according to the present embodiment, on the other hand, the fixing region 210 is fixed to the concave part 320 of the base part 40, as shown in FIG. 8(b).

In the magnetic head suspension 1B of such a configuration, the plate thickness at the fixing portion of the load bending part 30 and the base part 40 can be reduced, and the space in the Z direction (direction orthogonal to the recording surface of the recording medium) of the magnetic head suspension 1B can be saved, in addition to the advantages of the first embodiment.

In the present embodiment, the fixing region 210 is positioned in the concave part 320 in a state where the base part 40 is arranged such that the concave part 320 faces the recording medium, but obviously, the fixing region 210 may be positioned in the concave part 320 in a state where the base part 40 is arranged such that the concave part 320 faces the side opposite to the recording medium (state shown in FIGS. 3(a)-3(c)).

Third Embodiment

Still another embodiment of the magnetic head suspension according to the present invention will now be described with reference to the accompanying drawings.

FIGS. 9(a) and 9(b) respectively show a plan view and a side view of a base part 40C in a magnetic head suspension 1C according to the present embodiment.

The same reference numerals denote the same members as in the first and second embodiments, and the description thereof will be omitted.

The magnetic head suspension 1C according to the present embodiment includes a base part 40C in place of the base part 40 in the magnetic head suspension 1A of the first embodiment.

Specifically, the base part 40 in the first embodiment is configured by the third member 300 made of a single metal material.

The base part 40C in the present embodiment, on the other hand, is configured by a laminated member 300C formed by laminating a plurality of materials having different solid state properties one another, as shown in FIGS. 9(a) and 9(b).

Specifically, as shown in FIGS. 9(a) and 9(b), the laminated member 300C includes a first metal material 301C, a second metal material 302C and a resin material 303C sandwiched by the first and second metal materials 301C, 302C, the resin material 303C having a damping constant "C" (see equation (2)) larger than those of the first and second metal materials 301C, 302C.

In addition to the advantages of the first and second embodiments, it is possible to make the damping ratio of the base part 40C large by forming the base part 40C with such a laminated member 300C, thereby reducing the amplitude of the resonance mode of the magnetic head suspension 1C.

Examples of the resin material 303C include materials having a high damping effect such as polyimide and liquid crystal polymer.

Examples of the first and second metal materials 301C, 302C are stainless steel, aluminum, titanium, and the like.

FIGS. 10(a) to 10(e) show one example of a method of manufacturing the base part 40C using the laminated member 300C.

Figure 10:
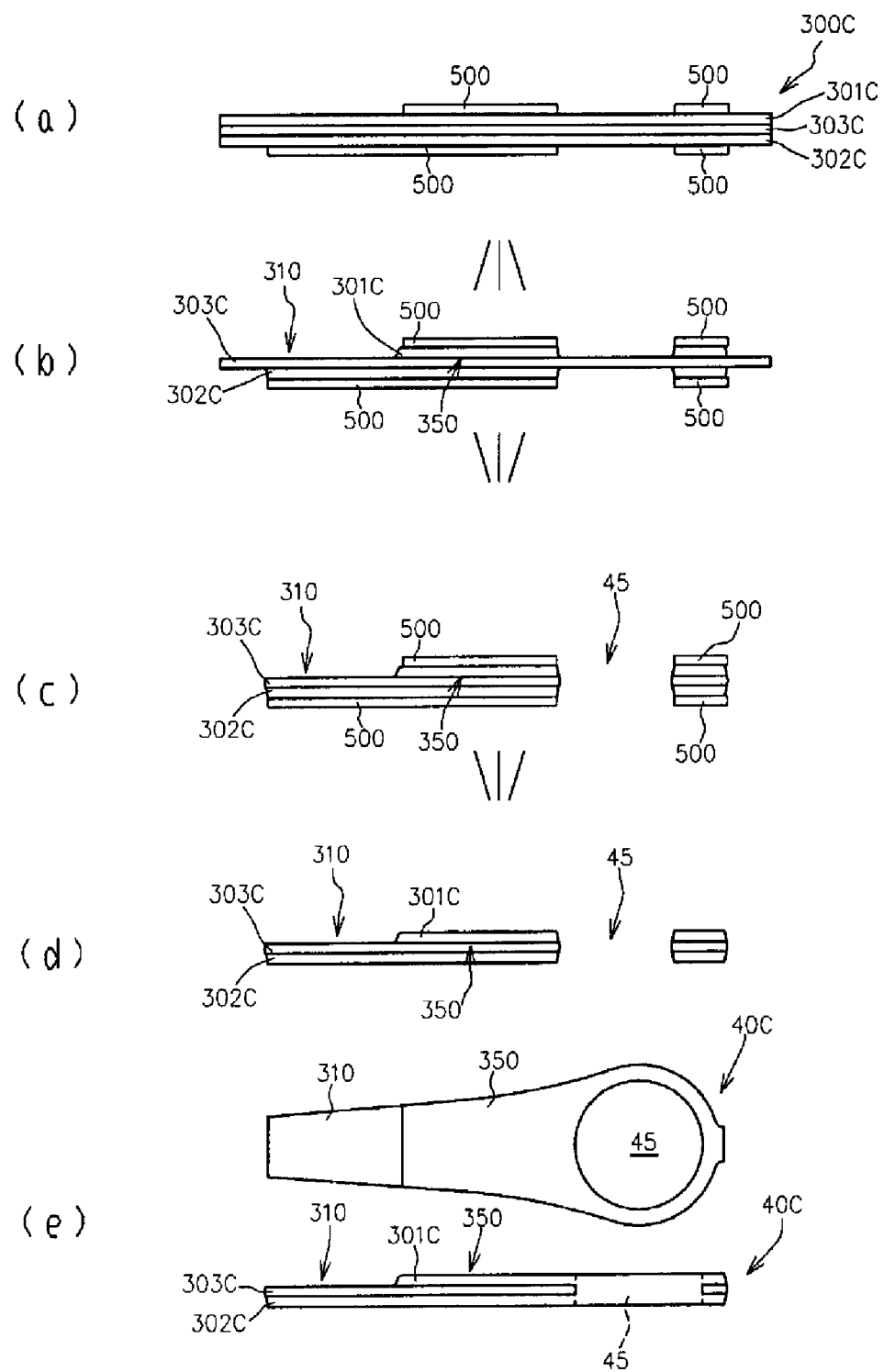

In the manufacturing method shown in FIGS. 10(a) to 10(e), the plate shaped laminated member 300C having the thickness necessary for the other region 350 is first prepared, and the laminated member 300C is covered with a resist 500 that complies with the outer shape of the final product (see FIG. 10(a)).

The resist 500 are arranged on both surfaces at the region corresponding to the other region 350, the resist 500 is arranged only on one surface (in the illustrated method, on the side of the second metal material 302C) at the region corresponding to the thin thickness region 310, and the resist 500 is not arranged on either surface at the region corresponding to the opening.

A first etching process is performed on the laminated member 300C with the resist 500 having the predetermined shape as the etching mask (see FIG. 10(b)).

The first etching process is performed from both surface sides of the laminated member 300C.

One of the first and the second metal materials 301C, 302C (the first metal material 301C in the illustrated configuration) exposed at the region corresponding to the thin thickness region 310 is partially or entirely etched and removed, and at the same time, both the first and second metal materials 301C, 302C exposed at the region to be provided with the holes are etched and removed according to the first etching process.

In the manufacturing method shown in FIGS. 10(a) to 10(e), one of the metal materials exposed at the thin thickness region 310 is completely removed by the first etching process so that the resin material 303C is exposed at the thin thickness region 310 (see FIG. 10(b)), but alternatively, only part of the one metal material exposed at the thin thickness region 310 may be removed so that the plate thickness of the thin thickness region 310 becomes thinner than the other region 350.

A second etching process is performed with the resist 500 or the remaining metal materials 301C, 302C as the etching mask (see FIG. 10(c)), and the resin material 303C remaining at the region to be provided with the opening is etched and removed.

The second etching process may be an etching using strong alkaline solution or plasma etching.

In the manufacturing method shown in FIG. 10(a) to 10(d), the second etching process is performed from the side (side of the second metal material 302C in the illustrated embodiment) on which the resist 500 is arranged at the region corresponding to the thin thickness region 310, whereby only the resin material 303C at the region to be provided with the opening is removed while leaving the resin material 303C at the thin thickness region 310.

Alternatively, the second etching process may be performed from both surface sides of the laminated member 300C, whereby the resin material 303C at the thin thickness region 310 can be removed as well as the resin material 303C at the region to be provided with the opening.

According to such an alternative method, only the other one of the first and the second metal materials (e.g., only second metal material 302C) remains in the thin thickness region 310 (see enlarged view of FIG. 9(b)).

Subsequently, the resist 500 is removed (FIG. 10(d)), and cleaning is performed to obtain the base part 40 (FIG. 10(e)).

According to such a manufacturing method, the thin thickness region 310 and the opening can be simultaneously formed. Furthermore, since the surface of the thin thickness region 310 is chemically dissolved, the base part 40C capable of reducing the amplitude can be obtained with the surface smoothness of the thin thickness region 310 improved.

The plate thickness of the thin thickness region 310 can be controlled with high accuracy by controlling etching conditions such as etching concentration and etching time/etching temperature.

In the present embodiment, the base part 40C is arranged in place of the base part 40 of the magnetic head suspension 1A according to the first embodiment, but obviously, the base part 40C could also be adopted in the magnetic head suspension 1B according to the second embodiment.

Fourth Embodiment

Still another embodiment of the magnetic head suspension according to the present invention will now be described with reference to the accompanying drawings.

FIGS. 11(a) and 11(b) respectively show a plan view and a side view of a base part 40D in a magnetic head suspension 1D according to the present embodiment.

Figure 8:
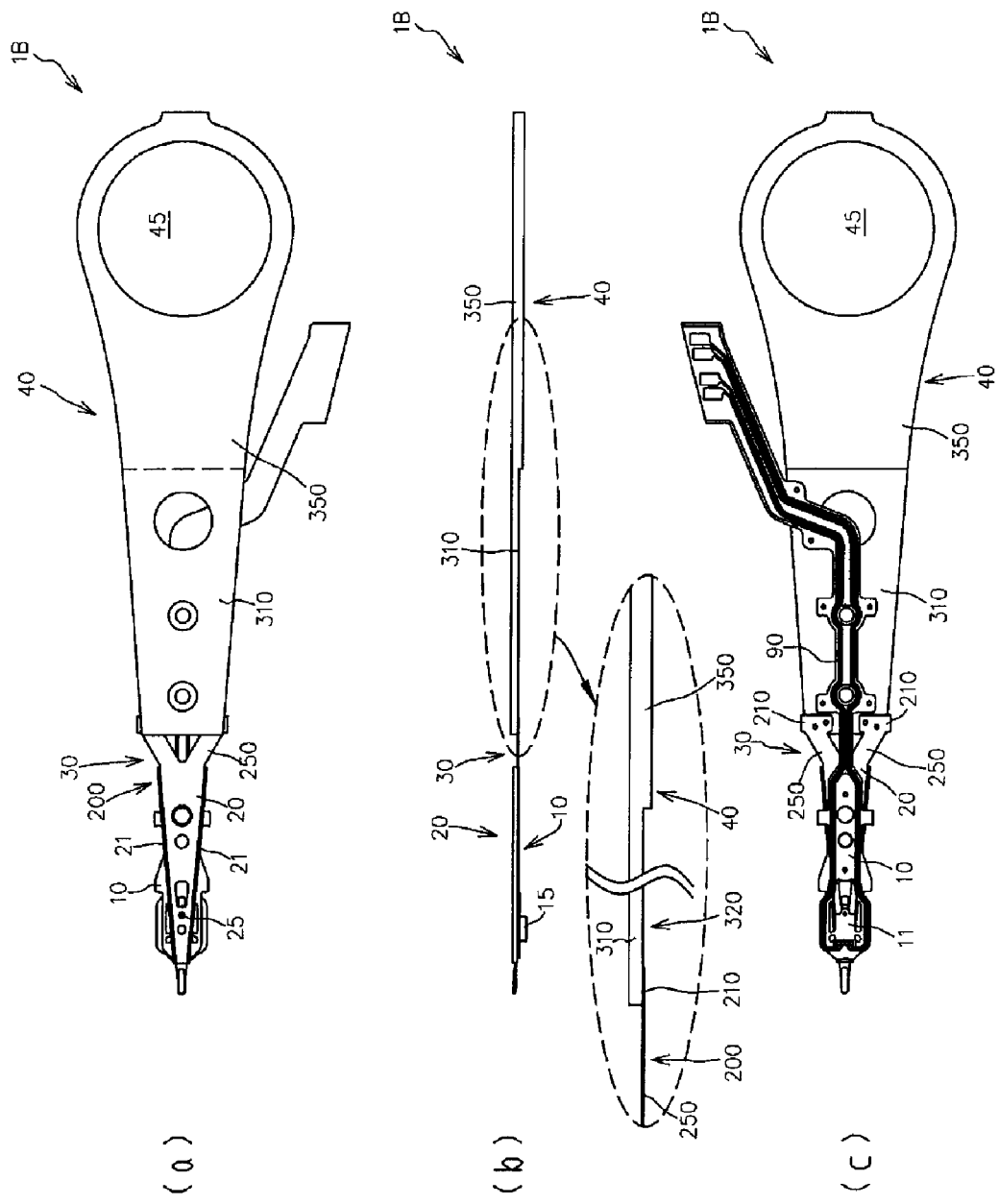
Figure 9:
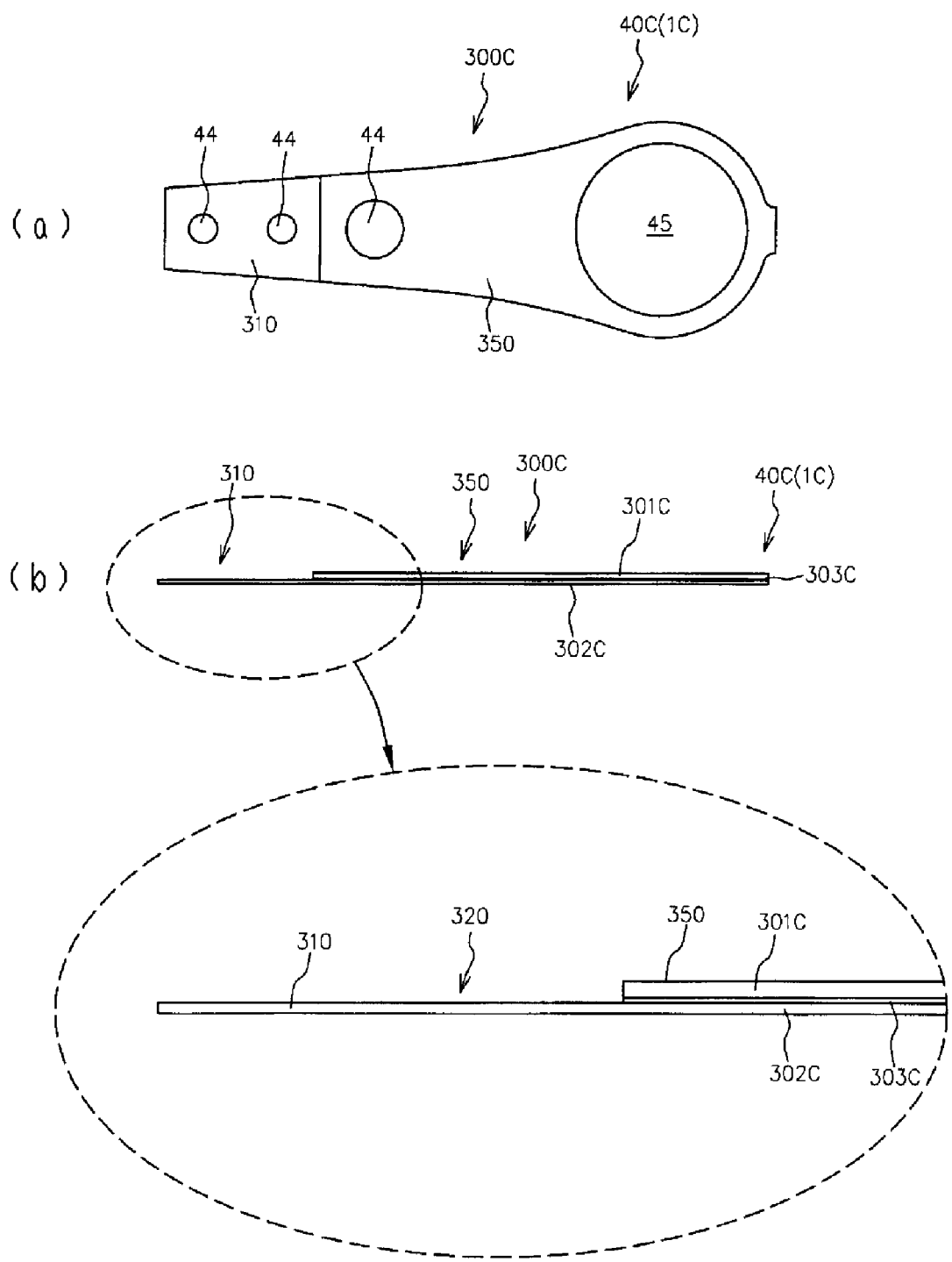

In the magnetic head suspensions 1A to 1C of the first to third embodiments, the boundary line between the thin thickness region 310 and the other region 350 is substantially linear along the width direction of the magnetic head suspension in plan view (see FIGS. 3, 8, 9 and so on).

On the other hand, the base part 1D of the magnetic head suspension 1D according to the present embodiment is configures so that the boundary line between the thin thickness region 310 and the other region 350 is a horseshoe shape in plan view such that the center in the width direction is positioned closer to the proximal end side than both sides in the width direction, as shown in FIGS. 11(a) and 11(b).

That is, in the present embodiment, the base part 40D is configured such that a thick thickness region 350D is existed at both sides in the width direction of a proximal end side edge of the thin thickness region 310.

In the magnetic head suspension 1D of such a configuration, the rigidity in the seek direction (horizontal direction) of the base part 40D can be increased by the thick thickness region 350D while achieving reduction in mass by the thin thickness region 310.

Therefore, the resonance characteristic in the seek direction could be further enhanced in the magnetic head suspension 1D including the base part 40D.

As shown in FIGS. 12(a) and 12(b), the boundary line between the thin thickness region 310 and the other region 350 is preferably a circular arc shape in plan view such that the center in the width direction is positioned closer to the proximal end side than both sides in the width direction.

A base part 40D' of such a configuration can be easily manufactured compared to the base part 40D in which the boundary line on the proximal end side of the thin thickness region 310 is formed into a substantially horseshoe shape in plan view.

Therefore, the magnetic head suspension 1D capable of further enhancing the resonance characteristic in the seek direction can be easily obtained.

Fifth Embodiment

Still another embodiment of the magnetic head suspension according to the present invention will now be described with reference to the accompanying drawings.

FIGS. 13(a) and 13(b) respectively show a plan view and a side view of a base part 40E in a magnetic head suspension 1E according to the present embodiment.

As shown in FIGS. 13(a) and 13(b), the base part 40E is configured so that the thin thickness region 310 extends from the distal end towards the proximal end side by a predetermined distance only at the center in the width direction, and the other region 350 including both end sides 350E in the width direction of the thin thickness region 310 has a thickness thicker than that of the thin thickness region 310.

That is, the base part 40E of the present embodiment is configured so that both end sides 350E in the width direction of the thin thickness region 310 has a thick thickness at an entire region in the longitudinal direction rather than at only the proximal end side.

In the magnetic head suspension 1E including the base part 40E of such a configuration, the rigidity in the vertical direction and in the torsional direction can be enhanced in addition to the horizontal direction.

Therefore, enhancement in resonance characteristics and enhancement in impact resistance could be more effectively achieved.

Sixth Embodiment

Still another embodiment of the magnetic head suspension according to the present invention will now be described with reference to the accompanying drawings.

FIGS. 14(a) and 14(b) respectively show an exploded plan view and a side view of a base part 40F in a magnetic head suspension 1F according to the present embodiment.

In each of the above embodiments, each of the base parts 40 to 40E has the thin thickness region 310 and the other region 350 formed by a single member.

In the present embodiment, however, the base part 40F has a member forming the thin thickness region 310 and a member forming the other region 350, these members being originally separated to each other and fixed to each other by welding and the like.

In other words, in the present embodiment, a member 300F configuring the base part 40F includes a thick thickness member 350F forming the other region 350 and a thin thickness member 310F forming the thin thickness region 310, the thin thickness member 301F being different body from the thick thickness member 350F.

The thick thickness member 350F and the thin thickness member 310F are fixed to each other to form the base part 40F.

In the magnetic head suspension 1F including the base part 40F of such a configuration, the thin thickness region 310 and an other region 350 are formed independently of each other, and thus the plate thickness of the thin thickness region 310 and the other region 350 can be more easily and conveniently controlled.

As shown in FIGS. 15(a) and 15(b), the thin thickness member 310F is preferably subjected to a bending process to form flange bending portions 311 on both end sides in the width direction of the thin thickness region 310.

In a magnetic head suspension 1F' including a base part 40F' of such a configuration, the rigidity in the horizontal direction, the vertical direction and the torsional direction can be increased while suppressing increase in mass.

Therefore, enhancement in resonance characteristics and enhancement in impact resistance can be more effectively achieved.

Figure 15:
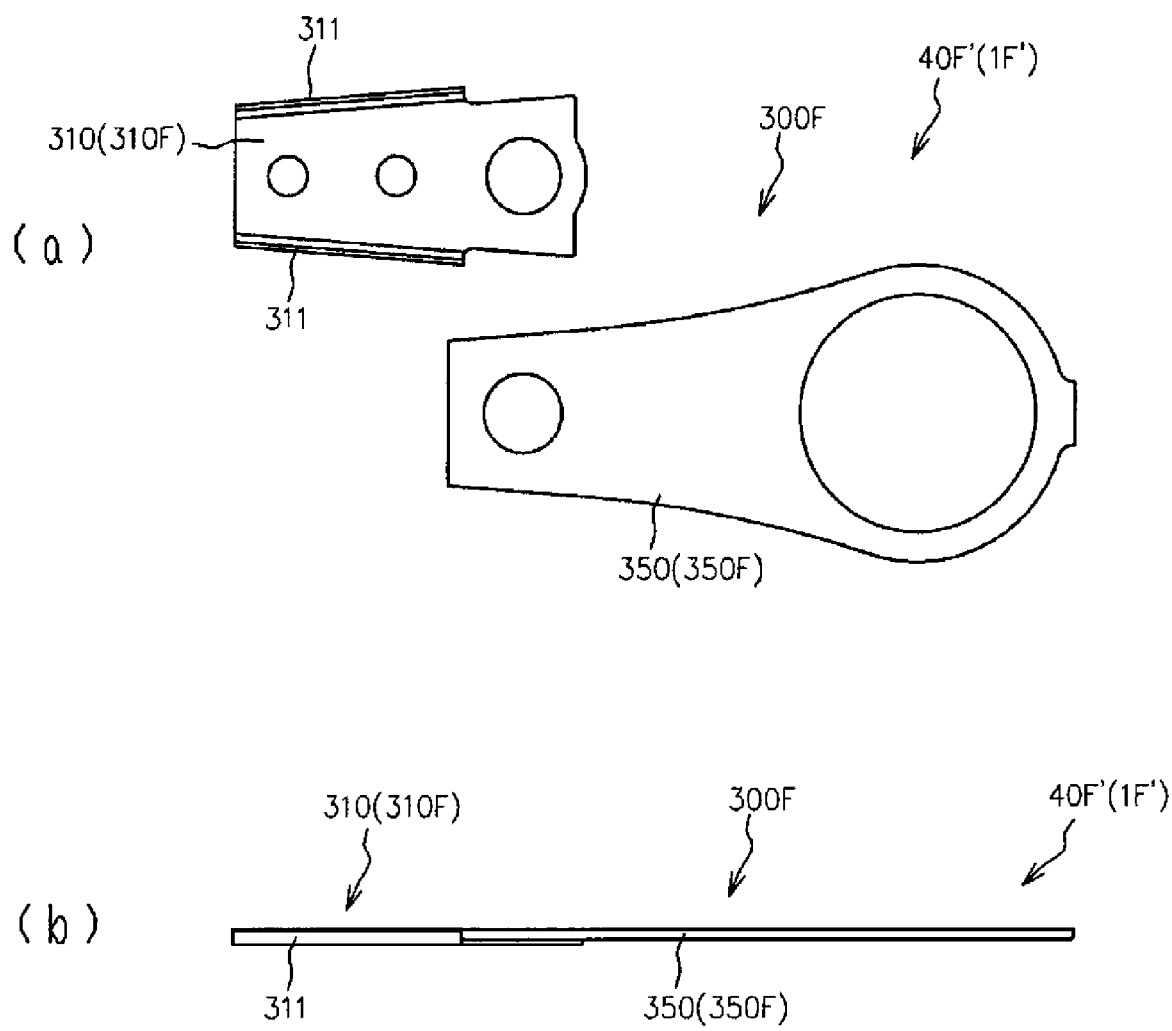

In the base part 40F' shown in FIG. 15, the flange bending portions 311 are arranged over substantially the entire region in the longitudinal direction of the thin thickness region 310, but the present invention is not limited to such a configuration, and may take various configurations where the flange bending portions 311 are arranged in at least one portion in the longitudinal direction of the thin thickness region 310.

In FIGS. 15(a) and 15(b), a configuration in which the flange bending portions 311 are arranged on both end sides in the width direction of the thin thickness region 310 has been described by taking an example of the case where the thin thickness region 310 and the other region 350 are formed with different members, but the configuration of arranging the flange bending portions 311 is not limited to the case in which the thin thickness region 310 and the other region 350 are formed with different members.

That is, the flange bending portions 311 may be arranged on both end sides of the thin thickness region 310 in the configuration in which the thin thickness region 310 and the other region 350 are integrally formed as in the first to the third embodiments.

In each of the above embodiments, the thin thickness region 310 is formed such that the entire region has the same thickness, but instead, the thin thickness region 310 may be formed so as to have a tapered region in which the plate thickness becomes thinner towards the distal end side. The tapered region may be formed over the entire region in the longitudinal direction of the thin thickness region 310 or the tapered region may be formed only at one portion in the longitudinal direction of the thin thickness region 310.

This specification is by no means intended to restrict the present invention to the preferred embodiment and the modified embodiment set forth therein. Various modifications to the suspension for supporting the magnetic head slider and the method of manufacturing the base part may be made by those skilled in the art without departing from the spirit and scope of the present invention as defined in the appended claims.

What is claimed is:

1. A magnetic head suspension comprising:
    a flexure part including a magnetic head mounting region for supporting a magnetic head slider, a load bending part for generating a load to press the magnetic head slider towards a recording medium, a load beam part for transmitting the load generated by the load bending part to the magnetic head mounting region, and a base part connected to a proximal end side of the load bending part,
    wherein a region of the base part which extends from a distal end of the base part towards a proximal end side by a predetermined distance and to which the proximal end side of the load bending part is connected is made to be a thin thickness region having a thin thickness compared to an other region,
    wherein a boundary line between the thin thickness region and the other region is a horseshoe shape in plan view so that its center in the width direction is positioned closer to a proximal end side of the base part,
    wherein the load bending part includes first and second fixing region portions that are fixed to the base part and a load generating region that is positioned between the first and second fixing region portions and the load beam part, and
    wherein the first and second fixing region portions are fixed to the base part within a concave part that is formed by the thin thickness region and the other region so as to be opened to a distal end side of the base part.

2. A magnetic head suspension according to claim 1, wherein the thin thickness region is provided with flange bending portions on both sides in the width direction of the thin thickness region in at least one area along the longitudinal direction of the thin thickness region.

3. A magnetic head suspension according to claim 1, wherein a member configuring the base part includes a thick thickness member configuring the other region and a thin thickness member configuring the thin thickness region, the thin thickness member being a different body from the thick thickness member, and wherein the thick thickness member and the thin thickness member are fixed to each other.

4. A magnetic head suspension according to claim 1, wherein the base part is formed by a single metal member.

5. A magnetic head suspension according to claim 1, wherein the base part is formed by a laminated member including a metal material and a resin material that has a damping constant larger than that of the metal material.

6. A magnetic head suspension according to claim 1, wherein the load bending part and the load beam part are formed integrally by a single member.

7. A magnetic head suspension according to claim 1, wherein the base part is arranged such that the concave part faces the recording medium.

8. A magnetic head suspension comprising:
    a flexure part including a magnetic head mounting region for supporting a magnetic head slider, a load bending part for generating a load to press the magnetic head slider towards a recording medium, a load beam part for transmitting the load generated by the load bending part to the magnetic head mounting region, and a base part connected to a proximal end side of the load bending part,
    wherein a region of the base part which extends from a distal end of the base part towards a proximal end side by a predetermined distance and to which the proximal end side of the load bending part is connected is made to be a thin thickness region having a thin thickness compared to an other region,
    wherein a boundary line between the thin thickness region and the other region is a circular arc shape in plan view so that its center in the width direction is positioned closer to a proximal end side of the base part,
    wherein the load bending part includes first and second fixing region portions that are fixed to the base part and a load generating region that is positioned between the first and second fixing region portions and the load beam part, and
    wherein the first and second fixing region portions are fixed to the base part within a concave part that is formed by the thin thickness region and the other region so as to be opened to a distal end side of the base part.

9. A magnetic head suspension according to claim 8, wherein the base part is arranged such that the concave part faces the recording medium.

* * * * *